(12) United States Patent
Zhang et al.

(10) Patent No.: US 11,216,103 B2
(45) Date of Patent: Jan. 4, 2022

(54) PRESSURE TOUCH CONTROL DISPLAY APPARATUS AND CONTROL METHOD THEREFOR

(71) Applicant: BOE TECHNOLOGY GROUP CO., LTD., Beijing (CN)

(72) Inventors: Chunfang Zhang, Beijing (CN); Xiangxiang Zou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/320,266

(22) PCT Filed: May 15, 2018

(86) PCT No.: PCT/CN2018/086826
§ 371 (c)(1),
(2) Date: Jan. 24, 2019

(87) PCT Pub. No.: WO2018/228114
PCT Pub. Date: Dec. 20, 2018

(65) Prior Publication Data
US 2019/0272075 A1 Sep. 5, 2019

(30) Foreign Application Priority Data
Jun. 16, 2017 (CN) .......................... 201710456706.2

(51) Int. Cl.
*G06F 3/041* (2006.01)
*G06F 3/044* (2006.01)
(Continued)

(52) U.S. Cl.
CPC ........ *G06F 3/0414* (2013.01); *G02F 1/13338* (2013.01); *G02F 1/133305* (2013.01);
(Continued)

(58) Field of Classification Search
CPC ...... G06F 3/0414; G06F 3/016; G06F 3/0412; G06F 3/041; G06F 3/04146;
(Continued)

(56) References Cited

U.S. PATENT DOCUMENTS 8,421,483 B2 * 4/2013 Klinghult .............. G06F 3/0445
324/686
9,846,091 B2 * 12/2017 Lu ............................ G01L 1/16
(Continued)

FOREIGN PATENT DOCUMENTS

CN 205158318 U 4/2016
CN 105824468 A 8/2016
(Continued)

OTHER PUBLICATIONS

First Chinese Office Action dated Mar. 1, 2019.
International Search Report and Written Opinion dated Jul. 31, 2018.

*Primary Examiner* — Dismery Mercedes
(74) *Attorney, Agent, or Firm* — Dilworth & Barrese, LLP.; Michael J. Musella, Esq.

(57) ABSTRACT

A pressure touch control display apparatus and a control method therefor. The pressure touch control display apparatus includes a backlight module, a piezoelectric component and a monitoring circuit, wherein the piezoelectric component is arranged on a reflection sheet of the backlight module, and the piezoelectric component is deformed under the action of a pressure and generates an electrical signal corresponding to the pressure; and the monitoring circuit is electrically connected to the piezoelectric component, and the monitoring circuit is used for monitoring the electrical signal generated by the piezoelectric component.

9 Claims, 2 Drawing Sheets

(51) Int. Cl.
  *G02F 1/1333* (2006.01)
  *G02F 1/13357* (2006.01)

(52) U.S. Cl.
  CPC .. *G02F 1/133394* (2021.01); *G02F 1/133602* (2013.01); *G06F 3/041* (2013.01); *G06F 3/0412* (2013.01); *G06F 3/0416* (2013.01); *G06F 3/0447* (2019.05); *G06F 3/04144* (2019.05); *G06F 3/04146* (2019.05); *G02F 1/133605* (2013.01); *G06F 2203/04105* (2013.01)

(58) Field of Classification Search
  CPC ......... G06F 3/0416; G06F 2203/04105; G06F 3/03547; G06F 3/044; G06F 3/0488; G06F 2203/04103; G06F 2203/04102; G06F 3/0443; G06F 3/04144; G06F 1/1626; G02F 1/133305; G02F 1/13338; G02F 1/133553; G02F 1/13394; G02F 1/133602; G02F 2001/133394; G02F 2001/13398; G02F 1/133394; G02F 1/13398; G02F 1/1333; G02F 1/13396; G02F 1/133605
  See application file for complete search history.

(56) References Cited

U.S. PATENT DOCUMENTS

| | | | | |
|---|---|---|---|---|
| 9,864,458 B2* | 1/2018 | Li | .................. | G02B 6/0055 |
| 9,995,926 B1* | 6/2018 | Sakai | .................. | G02B 26/005 |
| 10,048,792 B1* | 8/2018 | Schediwy | ............ | G06F 3/0418 |
| 10,120,449 B2* | 11/2018 | Khoshkava | .............. | G08B 6/00 |
| 10,488,970 B2* | 11/2019 | Yoon | .................... | G06F 3/0446 |
| 10,592,034 B2* | 3/2020 | Shim | .................... | G06F 1/1671 |
| 10,788,914 B2* | 9/2020 | Gu | ........................ | G06F 3/0447 |
| 11,073,914 B2* | 7/2021 | Kim | .................... | H01L 27/3244 |
| 2007/0195231 A1* | 8/2007 | Kuribayashi | ..... | G02F 1/133707 349/106 |
| 2010/0097548 A1* | 4/2010 | Koito | .................... | G06F 3/0412 349/113 |
| 2010/0117809 A1* | 5/2010 | Dai | ........................ | G06F 3/041 340/407.2 |
| 2010/0128002 A1* | 5/2010 | Stacy | .................... | G06F 3/0446 345/174 |
| 2012/0075221 A1 | 3/2012 | Yasuda | | |
| 2014/0063365 A1* | 3/2014 | Li | .......................... | G06F 3/0412 349/12 |
| 2015/0009164 A1* | 1/2015 | Shinozaki | ............. | G06F 3/0416 345/173 |
| 2015/0261367 A1* | 9/2015 | Zhang | .................... | G06F 3/0412 345/173 |
| 2016/0018893 A1* | 1/2016 | Choi | ........................ | G06F 3/041 345/177 |
| 2016/0117034 A1* | 4/2016 | Day | ........................ | G06F 3/0416 345/174 |
| 2016/0306481 A1* | 10/2016 | Filiz | .......................... | G01L 1/16 |
| 2016/0328065 A1* | 11/2016 | Johnson | ................ | G06F 3/0488 |
| 2017/0108973 A1* | 4/2017 | Kim | .................... | G02F 1/134309 |
| 2017/0131160 A1* | 5/2017 | Lu | .............................. | G01L 1/16 |
| 2017/0131818 A1* | 5/2017 | Chang | .................... | G06F 3/0445 |
| 2017/0168641 A1* | 6/2017 | Cheng | .................... | G06F 3/0447 |
| 2017/0192560 A1* | 7/2017 | Ham | .................... | H04M 1/0266 |
| 2017/0308221 A1* | 10/2017 | Li | .......................... | G06F 3/0447 |
| 2018/0031885 A1* | 2/2018 | Nakamori | ........... | G06F 3/04164 |
| 2018/0081441 A1* | 3/2018 | Pedder | .................. | G06F 3/0414 |
| 2018/0088720 A1 | 3/2018 | Wang et al. | | |
| 2018/0136756 A1* | 5/2018 | Kano | .................... | G06F 3/0414 |
| 2018/0329558 A1* | 11/2018 | Park | ........................ | G06F 3/0414 |
| 2018/0356663 A1* | 12/2018 | Zhang | .................... | G06F 3/0412 |

FOREIGN PATENT DOCUMENTS

| | | |
|---|---|---|
| CN | 106155421 A | 11/2016 |
| CN | 206209645 U | 5/2017 |
| CN | 107272953 A | 10/2017 |

* cited by examiner

PRESSURE TOUCH CONTROL DISPLAY APPARATUS AND CONTROL METHOD THEREFOR

The present application claims priority to the Chinese patent application No. 201710456706.2, filed on Jun. 16, 2017, the entire disclosure of which is incorporated herein by reference as part of the present application.

TECHNICAL FIELD

Embodiments of the present disclosure relate to a force touch display device and a control method thereof.

BACKGROUND

The force touch display device is much widely applied in the display technology field of various industries. When being touched and pressed in the touch area by a user, the force touch display device can sense a touched position and a touch force in the touch area, so that human-device interaction can be realized only by touching and pressing a pattern or a text in the touch area by the user.

A force touch display device generally includes a force sensing component, a signal detection circuit, and a processing chip. The force sensing component is configured to sense a pressing force applied to a touch region, and generate a corresponding electrical signal. The signal detection circuit is electrically connected with the force sensing component and configured to detect the electrical signal generated by the force sensing component. The processing chip is electrically connected with the signal detection circuit and configured to determine whether to activate the force touch function of the force touch display device or not according to the electrical signal detected by the signal detection circuit.

At present, the force sensing component in the force touch display device is usually a capacitive force sensing component or a resistive force sensing component. Upon the touch region being touched by a user, the capacitive force sensing component or the resistive force sensing component generates a corresponding electrical signal. However, the capacitive force sensing component or the resistive force sensing component usually needs to be pre-applied with a reference electrical signal during operation, thus the capacitive force sensing component or the resistive force sensing component is easy to be interfered by other electrical signals (such as a voltage on the pixel electrode in the display panel of the force touch display device) in the touch display device or by external electrical signals during operation, so that the force touch display device has poor anti-interference capability. Moreover, because the capacitive force sensing component or the resistive force sensing component has poor anti-interference capability, the sensitivity and accuracy of the capacitive force sensing component or the resistive force sensing component for sensing the touch force are poor, that is, the force touch display device has poor sensitivity and poor accuracy.

SUMMARY

The embodiments of the present disclosure provide a force touch display device including a backlight module, the force touch display device further includes a piezoelectric component and a detection circuit, the piezoelectric component is on a reflection sheet of the backlight module, the piezoelectric component is configured to be deformed under an action of a pressing force and generate an electrical signal corresponding to the pressing force, and the detection circuit is electrically connected with the piezoelectric component and configured to detect the electrical signal generated by the piezoelectric component.

For example, the piezoelectric component includes a piezoelectric film and a plurality of support members, the plurality of support members are evenly distributed on a surface of the reflection sheet facing a diffusion sheet of the backlight module, the piezoelectric film is located on a surface of the reflection sheet facing away from the diffusion sheet, and the piezoelectric film is electrically connected with the detection circuit.

For example, the piezoelectric film is formed of piezoelectric polymer material.

For example, the piezoelectric film is formed of polyvinylidene fluoride.

For example, the piezoelectric film covers an entirety of the surface of the reflection sheet facing away from the diffusion sheet, or the piezoelectric film includes a plurality of strip-shaped structures arranged in parallel with each other, each of the strip-shaped structures is arranged corresponding to at least one of the plurality of the support members, and each of the strip-shaped structures is electrically connected with the detection circuit; or the piezoelectric film includes a plurality of block-shaped structures arranged evenly, each of the plurality of block-shaped structures is arranged corresponding to at least one of the plurality of support members, and each of the block-shaped structures is electrically connected with the detection circuit.

For example, the piezoelectric component includes a plurality of support members evenly distributed on a surface of the reflection sheet facing a diffusion sheet of the backlight module, the plurality of support members are electrically connected with the detection circuit, and the plurality of support members are formed of piezoelectric material.

For example, each of the support members includes a base fixed on the reflection sheet and a support post extending toward the diffusion sheet, and the base is fixed on a surface of the reflection sheet facing the diffusion sheet, or the reflection sheet is provided with a plurality of recesses on a surface of the reflection sheet facing the diffusion sheet, and the base is fixed in a corresponding one of the plurality of recesses.

For example, the force touch display device further includes a processing chip, the processing chip is electrically connected with the detection circuit, and the processing chip is configured to activate a force touch function of the force touch display device according to the electrical signal generated by the piezoelectric component and detected by the detection circuit.

The embodiments of the present disclosure provide a control method of the force touch display device provided by the above-mentioned technical solutions, includes: turning on the detection circuit; allowing the piezoelectric component to be deformed under the action of the pressing force and generate the electrical signal corresponding to the pressing force; detecting, by the detection circuit, the electrical signal generated by the piezoelectric component.

For example, after detecting, by the detection circuit, the electrical signal generated by the piezoelectric component, the method further includes: comparing, by the processing chip, the electrical signal detected by the detection circuit with a threshold electrical signal; activating, by the processing chip, a force touch function of the force touch display device when the electrical signal detected by the detection circuit is greater than or equal to the threshold electrical signal.

BRIEF DESCRIPTION OF THE DRAWINGS

In order to clearly illustrate the technical solution of the embodiments of the present disclosure, the drawings of the embodiments will be briefly described in the following. Obviously, the described drawings below are merely related to some of the embodiments of the present disclosure without constituting any limitation thereto.

Figure 1:
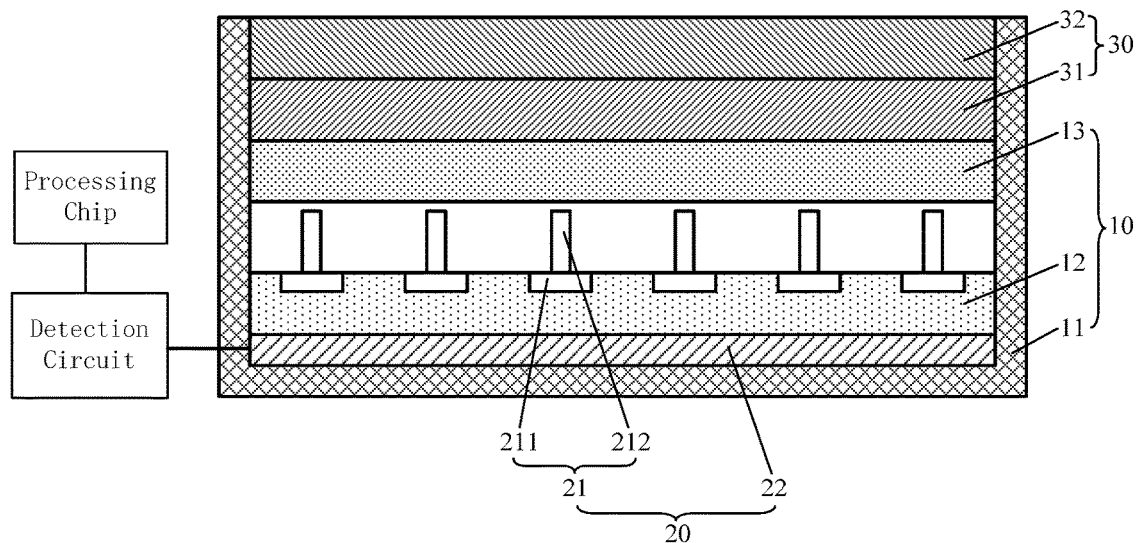
FIG. 1 is a schematic view of a structure of a force touch display device according to an embodiment of the present disclosure.

Reference numerals: 10—backlight module, 11—back plate, 12—reflection sheet, 13—diffusion sheet, 20—piezoelectric component, 21—support member, 211—base, 212—support post, 22—piezoelectric film, 30—display panel, 31—array substrate, 32—color filter substrate.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the protection scope of the present disclosure.

Embodiments of the present disclosure provide a force touch display device to solve the technical problem that a force touch display device has weak anti-interference capability, poor sensitivity and poor accuracy.

In the force touch display device provided by the embodiment of the present disclosure, the piezoelectric component is deformed under an action of a pressing force and generates an electrical signal corresponding to the pressing force, and the electrical signal generated by the piezoelectric component is detected by the detection circuit. That is, in the force touch display device provided by the present disclosure, the piezoelectric component does not need to be pre-applied with a reference electrical signal during operation, thus the piezoelectric component is not interfered, by other electrical signals in the force touch display device during operation (e.g., a voltage on a pixel electrode of a display panel in the force touch display), or by external electrical signal, so that the force touch display device has high anti-interference capability. Meanwhile, the piezoelectric component, in the force touch display device, provided by the embodiment of the present disclosure, is not interfered by other electrical signals in the force touch display device or external electrical signals, and the piezoelectric component is deformed under an action of a pressing force and generates a corresponding electrical signal, so that sensitivity and accuracy are higher when the touch or press is sensed by the piezoelectric component, thereby improving the sensitivity and accuracy of the force touch display device.

Embodiments of the present disclosure provide a control method of a force touch display device, in order to solve the problem of weak anti-interference capability of a force sensing component in existing art, and of poor sensitivity and poor accuracy when a pressing force is sensed by the force sensing component in existing art.

The control method of the force touch display device has the same advantages as the force touch display device described above, without repeating herein.

Figure 2:
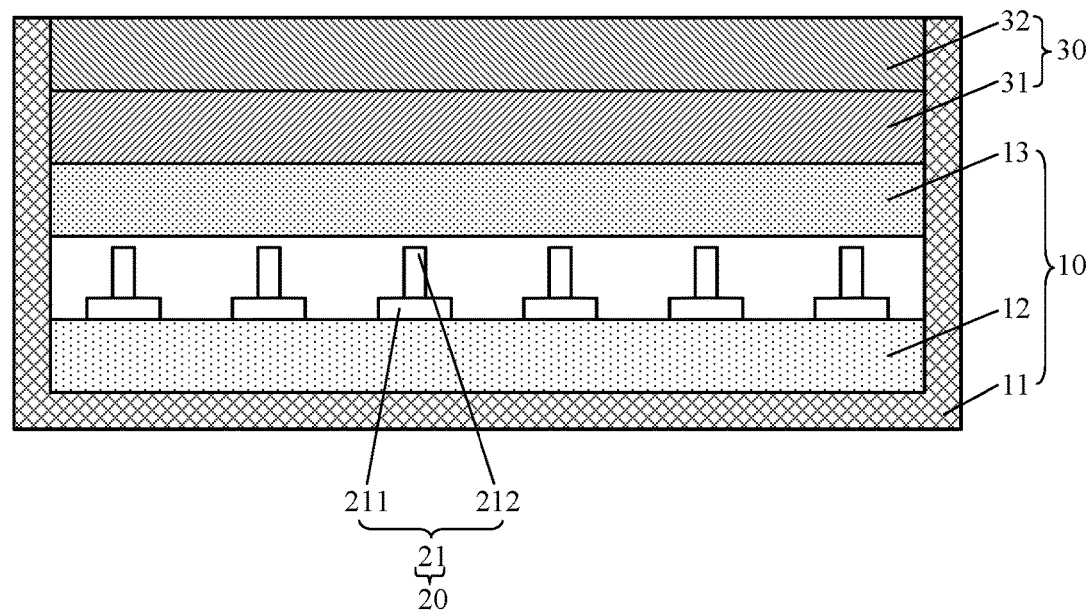
FIG. 2 is a schematic view of a structure of another force touch display device according to an embodiment of the present disclosure.

Referring to FIG. 1 or FIG. 2, the force touch display device provided by the embodiment of the present disclosure includes a backlight module 10. The force touch display device further includes a piezoelectric component 20 and a detection circuit, and the piezoelectric component 20 is disposed on a reflection sheet 12 of the backlight module 10, the piezoelectric component 20 is configured to be deformed under an action of a pressing force and generate an electrical signal corresponding to the pressing force; the detection circuit is electrically connected with the piezoelectric component 20 and configured to detect the electrical signal generated by the piezoelectric component 20.

For example, referring to FIG. 1 or FIG. 2, the force touch display device provided by the embodiment of the present disclosure includes a backlight module 10 and a display panel 30. The backlight module 10 may be a edge-lit backlight module 10, in this case, the backlight module 10 includes a back plate 11, a light-emitting assembly (not shown in the figures) disposed in the back plate 11, a reflection sheet 12, a light guide plate (not shown), and a diffusion sheet 13. The reflection sheet 12 is located on a bottom surface of the back plate 11. The reflection sheet 12, the light guide plate, and the diffusion sheet 13 are sequentially stacked. The light-emitting assembly is located in the back plate 11 and on a side of the back plate 11, and a light-emitting element of the light-emitting assembly faces a surface of the light guide plate facing a side wall of the back plate 11. Alternatively, the backlight module 10 may be a direct-lit backlight module 10, in this case, the backlight module 10 includes a back plate 11 and a light-emitting assembly (not shown) disposed in the back plate 11, a reflection sheet 12, and a diffusion sheet 13. The reflection sheet 12 is disposed on a bottom surface of the back plate 11, and the reflection sheet 12 and the diffusion sheet 13 are sequentially stacked; a light-emitting element of the light-emitting assembly is located on a side of the reflection sheet 12 facing the diffusion sheet 13; the display panel 30 is located on a light-exiting side of the backlight module 10; the backlight module 10 is configured to provide backlight for the display panel 30 to achieve image display of the force touch display device. The display panel 30 may be a liquid crystal display panel. The liquid crystal display panel includes an array substrate 31 and a color filter substrate 32. The array substrate 31 of the liquid crystal display panel is closer to the light-exiting side of the backlight module 10 relative to the color filter substrate 32. The force touch display device provided by the embodiment of the present disclosure further includes a piezoelectric component 20 and a detection circuit. The piezoelectric component 20 is disposed on the reflection sheet 12 of the backlight module 10. It should be understood that the piezoelectric component 20 may be integrated with the reflection sheet 12 of the backlight module 10. When a user touches a touch area of the force touch display device, the pressing force is transmitted to the reflection sheet 12 of the backlight module 10, the piezoelectric component 20 is deformed under an action of the pressing force, and generates an electrical signal corresponding to the pressing force; the detection circuit is electrically connected with the piezoelectric component 20 and configured to detect the electrical signal generated by the piezoelectric component 20.

It may be seen from the above that in the force touch display device provided by the embodiment of the present disclosure, the piezoelectric component 20 is deformed under an action of a pressing force and generates an electrical signal corresponding to the pressing force, and the electrical signal generated by the piezoelectric component 20 is detected by the detection circuit. That is, in the force touch display device provided by the present disclosure, the piezoelectric component 20 does not need to be pre-applied with a reference electrical signal during operation, thus the piezoelectric component 20 is not interfered, by other electrical signals in the force touch display device during operation (e.g., a voltage on a pixel electrode of a display panel 30 in the force touch display), or by external electrical signals, so that the force touch display device has high anti-interference capability. Meanwhile, the piezoelectric component 20, in the force touch display device, provided by the embodiment of the present disclosure, is not interfered by other electrical signals in the force touch display device or external electrical signals, and the piezoelectric component 20 is deformed under an action of a pressing force and generates a corresponding electrical signal, so that sensitivity and accuracy are higher when the touch or press is sensed by the piezoelectric component 20, thereby improving the sensitivity and accuracy of the force touch display device.

In addition, in the force touch display device provided by the embodiment of the present disclosure, the piezoelectric component 20 is deformed under an action of a pressing force and generates a corresponding electrical signal, so that it only needs to provide a structure with piezoelectric effect in the piezoelectric component 20 to sense a touch or press, without providing a plurality of electrodes or a multi-layered film structure, the piezoelectric component 20 has a simple structure. Moreover, the piezoelectric component 20 is disposed on the reflection sheet 12 of the backlight module 10, that is, the piezoelectric component 20 is integrated with the reflection sheet 12 of the backlight module 10, thereby simplifying the structure of the force touch display device.

In the above embodiment, the piezoelectric component 20 may be provided in various ways. Two exemplary arrangements are exemplified below, but the arrangement of the piezoelectric component 20 is not limited to the following two types.

First type: referring to FIG. 1, the piezoelectric component 20 may include a piezoelectric film 22 and a plurality of support members 21, and the plurality of support members 21 are evenly distributed on the surface of the reflection sheet 12 facing the diffusion sheet 13 of the backlight module 10. The piezoelectric film 22 is located on a surface of the reflection sheet 12 facing away from the diffusion sheet 13, and the piezoelectric film 22 is electrically connected with the detection circuit. During operation, a user touches a touch area of the force touch display device, and a pressing force of the user is transmitted to the diffusion sheet 13, and then transmitted to the support members 21 and the reflection sheet 12, and acts on the piezoelectric film 22, thus the piezoelectric film 22 is deformed by the action of the pressing force, and generates an electric signal corresponding to the pressing force, and the electric signal is detected by the detection circuit.

In the first type, when the backlight module 10 is a direct-lit backlight module 10, the support members 21 may be configured to support the diffusion sheet 13 to maintain a certain distance between the diffusion sheet 13 and the reflection sheet 12, and the distance may be determined according to a light-mixing distance of the light-emitting element.

In the first type, the piezoelectric film 22 may be formed of various materials. For example, a forming material of the piezoelectric film 22 may be piezoelectric ceramic, piezoelectric polymer material or the like. For example, a forming material of the piezoelectric film 22 is piezoelectric polymer. A forming material of the piezoelectric film 22, for example, may be polyvinylidene fluoride (PVDF). When the material for forming the piezoelectric film 22 is selected as the piezoelectric polymer, the formation of the piezoelectric film 22 can be facilitated, and the thickness of the piezoelectric film 22 can be reduced.

In the first type, the piezoelectric film 22 may cover an entirety of the surface of the reflection sheet 12 facing away from the diffusion sheet 13. That is, the piezoelectric film 22 has a monolithic structure; or, the piezoelectric film 22 may include a plurality of strip-shaped structures arranged in parallel with each other. Each of the plurality of strip-shaped structures corresponds to at least one support member 21, and each of the plurality of strip-shaped structures is electrically connected with the detection circuit; or, the piezoelectric film 22 may include a plurality of block-shaped structures evenly arranged, each of the plurality of block-shaped structures corresponds to at least one support member 21, and each of the block-shaped structures is electrically connected with the detection circuit. When the piezoelectric film 22 includes a plurality of strip-shaped structures or a plurality of block-shaped structures, it is convenient to determine the position where the user touches.

In the first type, the support member 21 of the piezoelectric component 20 is adopted to transmit a pressing force to the piezoelectric film 22 disposed on the surface of the reflection sheet 12 facing away from the diffusion sheet 13, thereby realizing the sensing of the pressing force. In practical applications, the piezoelectric component 20 may also be adopted in the following manner.

Second type: referring to FIG. 2, the piezoelectric component 20 may include a plurality of support members 21 uniformly distributed on the surface of the reflection sheet 12 facing the diffusion sheet 13 of the backlight module 10, the plurality of support members 21 are electrically connected with the detection circuit, and the plurality of support members 21 are formed of piezoelectric material. During operation, a user touches a touch area of the force touch display device, and a pressing force applied by the user is transmitted to the diffusion sheet 13 and then transmitted to the support member 21 to allow the support member 21 to be deformed by the action of the pressing force, so that an electrical signal corresponding to the pressing force is generated by the support member 21 and detected by the detection circuit.

In the second type, the forming material of the support member 21 is selected as a piezoelectric material having a piezoelectric effect, and the support member 21 is deformed by the action of the pressing force, and generates an electrical signal corresponding to the pressing force to realize the sensing of the pressing force. Compared with the first type, the structure of the piezoelectric component 20 in the second type is simpler.

Similarly, in the second type, when the backlight module 10 is a direct-lit backlight module 10, the support member 21 can support the diffusion sheet 13 to maintain a certain distance between the diffusion sheet 13 and the reflection sheet 12, and the distance may be determined according to a light-mixing distance of the light-emitting element.

It is worth mentioning that in the second type, a forming material of the supporting member 21 is a piezoelectric material. In practical applications, the forming material of the supporting member 21 may be a piezoelectric ceramic or a piezoelectric polymer material.

Referring to FIG. 1 or FIG. 2, in the first or second type, the support member 21 may include a base 211 fixed on the reflection sheet 12 and a support post 212 extending toward the diffusion sheet 13. Referring to FIG. 1, the reflection sheet 12 is provided with a plurality of recesses on a surface of reflection sheet facing the diffusion sheet 13, and the base 211 is fixed in a corresponding recess. Alternatively, referring to FIG. 2, the base 211 may be fixed on the surface of the reflection sheet 12 facing the diffusion sheet 13.

The force touch display device provided by the embodiment of the present disclosure further includes a processing chip. The processing chip is electrically connected with the detection circuit. The processing chip is configured to activate a force touch function of the force touch display device according to the electrical signal generated by the piezoelectric component 20 and detected by the detection circuit. For example, the detection circuit is configured to detect the electrical signal generated by the piezoelectric component 20 and to transmit the detected electrical signal to the processing chip, and the processing chip may process the electrical signal detected by the detection circuit to determine whether to activate the force touch function of the force touch display device or not. For example, the processing chip is configured to compare the electrical signal detected by the detection circuit with a threshold electrical signal, and when the electrical signal detected by the detection circuit is greater than or equal to the threshold electrical signal, it is determined that the user needs to use the force touch function, the processing chip activates the force touch function of the force touch display device, so as to facilitate the user to use the force touch function. For example, the force touch function is used to adjust the brightness, volume or the like of the force touch display device.

Figure 3:
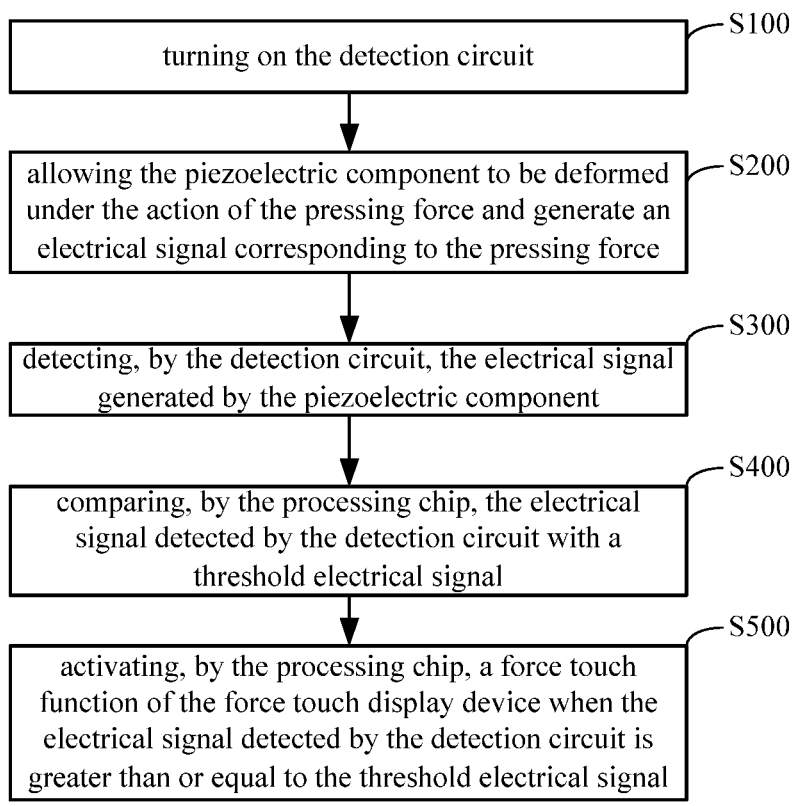
FIG. 3 is a flowchart of a control method of a force touch display device according to an embodiment of the present disclosure.

Referring to FIG. 3, an embodiment of the present disclosure further provides a control method of the force touch display device according to the above embodiment, including the following steps.

Step S100, turning on the detection circuit.

Step S200, allowing the piezoelectric component to be deformed under the action of the pressing force and generate the electrical signal corresponding to the pressing force.

Step S300, detecting, by the detection circuit, the electrical signal generated by the piezoelectric component.

The various embodiments in the specification are described in a progressive manner, and the same or similar parts between the various embodiments may be referred to each other, and each embodiment focuses on the differences from the other embodiments. In particular, for the method embodiment, because it is basically similar to the device embodiment, the description is relatively simple, and the relevant parts may be referred to the description of the device embodiment.

It is worth mentioning that, in step S100, when the detection circuit is turned on, the detection circuit may be turned on in various manners. For example, a start button may be provided on the force touch display device, when a user presses the start button, the detection circuit is turned on. The detection circuit may detect the electrical signal generated by the piezoelectric component; or the detection circuit may be electrically connected with a touch panel of the force touch display device, when a user touches a touch area of the force touch display device, the touch panel receives the electrical signal caused by press of the user. At this time, the detection circuit is turned on, and the detection circuit can detect the electrical signal generated by the piezoelectric component.

Still referring to FIG. 3, after step S300 of detecting, by the detection circuit, the electrical signal generated by the piezoelectric component, the control method of the force touch display device provided by the embodiment of the present disclosure further includes the following steps.

Step S400: comparing, by the processing chip, the electrical signal detected by the detection circuit with a threshold electrical signal;

Step S500: activating, by the processing chip, a force touch function of the force touch display device when the electrical signal detected by the detection circuit is greater than or equal to the threshold electrical signal.

The above are merely specific implementations of the present disclosure without limiting the protection scope of the present disclosure thereto. The protection scope of the present disclosure should be based on the protection scope of the appended claims.

What is claimed is:

1. A force touch display device comprising a backlight module, wherein the backlight module comprises a back plate, a light-emitting assembly disposed in the back plate, a reflection sheet and a diffusion sheet, the force touch display device further comprises a piezoelectric component, the piezoelectric component is on the reflection sheet of the backlight module, the piezoelectric component is configured to be deformed under an action of a pressing force and generate an electrical signal corresponding to the pressing force, the force touch display device further comprises a detection circuit, wherein the detection circuit is electrically connected with the piezoelectric component and configured to detect the electrical signal generated by the piezoelectric component, wherein the piezoelectric component comprises a piezoelectric film and a plurality of support members, the plurality of support members are evenly distributed directly on a surface of the reflection sheet away from the piezoelectric film and directly contact with the reflection sheet, the piezoelectric film is located on a surface of the reflection sheet away from the diffusion sheet and directly contact with the reflection sheet, and the piezoelectric film is electrically connected with the detection circuit, the piezoelectric film, the reflection sheet, the support members, and the diffusion sheet are located on the back plate in sequence.

2. The force touch display device according to claim 1, wherein the piezoelectric film is formed of piezoelectric polymer material.

3. The force touch display device according to claim 2, wherein the piezoelectric film is formed of polyvinylidene fluoride.

4. The force touch display device according to claim 1, wherein the piezoelectric film covers an entirety of the surface of the reflection sheet facing away from the diffusion sheet; or the piezoelectric film comprises a plurality of strip-shaped structures arranged in parallel with each other, each of the strip-shaped structures is arranged corresponding to at least one of the plurality of the support members, and each of the strip-shaped structures is electrically connected with the detection circuit; or the piezoelectric film comprises a plurality of block-shaped structures arranged evenly, each of the plurality of block-shaped structures is arranged corresponding to at least one of the plurality of support members, and each of the block-shaped structures is electrically connected with the detection circuit.

5. The force touch display device according to claim 1, wherein the base is fixed on the reflection sheet and the support post extends toward the diffusion sheet, and
the base is fixed on a surface of the reflection sheet facing the diffusion sheet, or the reflection sheet is provided with a plurality of recesses on a surface of the reflection sheet facing the diffusion sheet, and the base is fixed in a corresponding one of the plurality of recesses.

6. The force touch display device according to claim 1, wherein the force touch display device further comprises a processing chip, the processing chip is electrically connected with the detection circuit, and the processing chip is configured to activate a force touch function of the force touch display device according to the electrical signal generated by the piezoelectric component and detected by the detection circuit.

7. A force touch display device comprising a backlight module, the backlight module comprises a back plate, a light-emitting assembly disposed in the back plate, a reflection sheet and a diffusion sheet, wherein the force touch display device further comprises a piezoelectric component, the piezoelectric component is on the reflection sheet of the backlight module, the piezoelectric component is configured to be deformed under an action of a pressing force and generate an electrical signal corresponding to the pressing force, wherein the piezoelectric component comprises a plurality of support members, each of the support members comprises a base and a support post, the reflection sheet is configured to reflect light from a light-emitting element of the light-emitting assembly, a plurality of support posts are evenly distributed on a surface of the reflection sheet facing the diffusion sheet of the backlight module and a plurality of bases are provided on the reflection sheet and directly contact with the reflection sheet, the plurality of support posts are provided on a side of the base opposite to the reflection sheet and directly contact with the base, the plurality of support members are electrically connected with the detection circuit, and the plurality of support members are formed of piezoelectric material, the reflection sheet, the support members, and the diffusion sheet are located on the back plate in sequence, and the plurality of support members and the plurality of bases are located between the reflection sheet and the diffusion sheet.

8. The force touch display device according to claim 7, further comprising a display panel, wherein the diffusion sheet is between the display panel and the reflection sheet.

9. The force touch display device according to claim 7, wherein the base is fixed on the reflection sheet and the support post extends toward the diffusion-sheet, and
the base is fixed on a surface of the reflection sheet facing the diffusion sheet, or the reflection sheet is provided with a plurality of recesses on a surface of the reflection sheet facing the diffusion-sheet, and the base is fixed in a corresponding one of the plurality of recesses.

\* \* \* \* \*